United States Patent [19]

Ibbotson

[11] 4,069,198

[45] Jan. 17, 1978

[54] POLYESTERS AND POLYESTER-URETHANES STABILIZED WITH ISOUREAS OR ISOCYANATE ADDUCTS THEREOF

[75] Inventor: Arthur Ibbotson, Manchester, England

[73] Assignee: Imperial Chemical Industries Limited, Great Britain

[21] Appl. No.: 588,946

[22] Filed: June 20, 1975

[30] Foreign Application Priority Data

July 29, 1974 United Kingdom ............... 33326/74
Oct. 14, 1974 United Kingdom ............... 44402/74

[51] Int. Cl.$^2$ .............................................. C08K 5/21
[52] U.S. Cl. ..................... 260/45.9 KB; 260/45.9 QA; 260/45.9 NC; 260/553 A; 260/564 E

[58] Field of Search ............. 260/45.9 NC, 45.9 QA, 260/45.9 KB, 553 A, 564 E; 71/85, DIG. 1

[56] References Cited

U.S. PATENT DOCUMENTS

| 2,780,535 | 2/1957 | Snyder ........................ 260/553 A X |
| 2,849,306 | 8/1958 | Searle ......................... 260/564 E X |
| 3,269,900 | 8/1966 | Rubin ............................. 71/DIG. 1 |
| 3,280,190 | 10/1966 | Kohle et al. ..................... 260/564 E |
| 3,891,423 | 6/1975 | Stanley et al. ................... 71/DIG. 1 |

*Primary Examiner*—Sandra M. Person
*Attorney, Agent, or Firm*—Cushman, Darby & Cushman

[57] ABSTRACT

A composition of matter which comprises a compound containing one or more ester groups, especially a polyester polyol or a polyester-urethane, and, as a stabilizer against hydrolysis, an isourea or an isocyanate adduct thereof.

5 Claims, No Drawings

POLYESTERS AND POLYESTER-URETHANES STABILIZED WITH ISOUREAS OR ISOCYANATE ADDUCTS THEREOF

This invention relates to compositions of matter and more particularly to compositions in which esters are stabilised against hydrolysis.

The instability of the ester group under conditions where hydrolysis can occur is well known. This instability affects monoesters, polyesters and also materials of a more complex nature wherein the ester group constitutes perhaps only a minor part of a chemical entity.

The present invention provides a composition of matter which comprises a compound containing one or more ester groups and, as a stabiliser, an isourea or an isocyanate adduct thereof.

Suitable stabilisers include compounds of the formula:

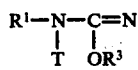

wherein T represents hydrogen or a group of the formula:

and $R^1$, $R^2$, $R^3$ and $R^4$ each independently represents an optionally substituted hydrocarbyl radical.

As examples of optionally substituted hydrocarbyl radicals which may be represented by $R^1$, $R^2$, $R^3$ and $R^4$ there may be mentioned optionally substituted alkyl, cycloalkyl and aryl radicals. It is preferred that each of $R^1$, $R^2$ and $R^4$ is an optionally substituted aryl radical. $R^3$ is preferably an optionally substituted alkyl radical especially an optionally substituted lower alkyl radical having from one to four carbon atoms. As examples of substituents which may be present in the alkyl radicals represented by $R^3$ there may be mentioned halogen, hydroxy, mercapto and amino groups. The compounds in which $R^3$ is an optionally substituted aryl radical are also useful stabilisers especially when R is an aryl radical carrying one or more electron-withdrawing substituents, for example nitro, cyano, carboalkoxy, halogen and trifluoromethyl.

The constitution of $R^1$, $R^2$, $R^3$ and $R^4$ may be such that the stabilisers contain one or more isourea residues per molecule. For example $R^3$ may be an optionally substituted alkyl radical of the formula:

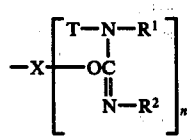

where X is an aliphatic residue and $n$ is a whole number from 1 to 7.

The stabilisers may be prepared by known methods. Thus, those compounds in which T is hydrogen may be prepared by reacting a substituted carbodiimide of the formula

with a hydroxy compound of the formula $R^3OH$. The products may then if desired, be reacted with isocyanates of the formula $R^4NCO$.

Examples of carbodiimides which may be used to make the stabilisers include diphenyl carbodiimide, di-p-tolyl carbodiimide, di-dodecyl carbodiimide, phenyl dodecyl carbodiimide or polycarbodiimides which may be prepared by polymerising a diisocyanate, optionally in the presence of monofunctional isocyanate or active hydrogen-containing compound to control the molecular weight. Examples of hydroxy compounds which may be reacted with the carbodiimides include methanol, ethanol, iso-propanol, cyclohexanol, ethylene glycol, polyethylene glycols, ethylene chlorhydrin, 2-dimethylaminoethanol, 2-mercaptoethanol, N-methyl- or N-phenylethanolamine, triethanolamine, tetrakis-2-hydroxyethylethylenediamine, glycerol, sorbitol, phenol and p-nitrophenol. Reaction between the carbodiimide and the hydroxy compound may be conveniently carried out at elevated temperatures, for example 150° C, or by using a basic catalyst, for example sodium methoxide.

The isoureas may also be prepared by phosgenating the corresponding (thio)urea and reacting the resulting chloroformamidine and/or carbonyl chloride with a metal alkoxide.

Any compound containing one or more ester groups may be present in the composition of the invention. Such compounds include monoesters, polyesters and compounds obtained by the polymerisation or reaction of esters containing other functional groups.

Compounds containing ester groups may be prepared in known manner by reacting an alcohol, for example methyl alcohol, ethyl alcohol, n-butyl alcohol, tert-butyl alcohol, octyl alcohol, benzyl alcohol, ethylene glycol, propylene glycol, diethylene glycol, 1,4-butanediol, glycerol, trimethylolpropane, pentaerythritol, sorbitol and sucrose with a carboxylic acid, for example acetic, propionic, chloroacetic, benzoic, phenylacetic, pyruvic, acrylic, methacrylic, polyacrylic, polymethacrylic, oleic, ricinoleic, oxalic, succinic, glutaric, adipic, sebacic, phthalic, isophthalic, terephthalic and trimesic acids.

Other ester group containing materials which may be stabilised in accordance with the invention include the polymers and copolymers of vinyl monomers containing ester groups for example the polymers and copolymers of vinyl acetate and methyl methacrylate. Further ester group containing materials which can be stabilised include polyurethanes prepared in known manner by the reaction of polyester polyols with organic polyisocyanates such as tolylene diisocyanate or diphenylmethane diisocyanate. Such polyurethanes can be in the form of rigid plastics, foams, elastomers, fibres, coatings or adhesives.

The stabiliser may be mixed with the compound containing one or more ester groups in any convenient manner. Thus it may be added directly to the compound itself or to a precursor thereof. Where an ester or polyester is used in a further reaction, for example with an organic polyisocyanate, the stabiliser may be added before or after this reaction has taken place.

The stabiliser should be added in a stabilising quantity, that is to say in an amount which will provide the required stabilising effect. Since the stability of ester groups varies considerably according to the environment, the amounts required to produce the desired stabilising effect can also vary widely. In general, suitable amounts will be found in the range of 0.1 to 10 parts by weight of stabiliser per 100 parts of compound containing one or more ester groups.

The compositions of the invention are of particular value under conditions of high humidity where hydrolysis of ester groups may cause a rapid deterioration of the corresponding unstabilised materials.

The invention is illustrated but not limited by the following Examples in which all parts and percentages are by weight.

EXAMPLE 1

A solution of polyester was prepared by dissolving poly(50/50 molar ethylene/tetramethylene adipate) having a hydroxyl value of 56 mg KOH/g (100 parts) in diethylene glycol dimethyl ether (300 parts), and water (100 parts) was added. To 100 parts of this solution was added the stabiliser (1 part) and the solution so made was placed in a stoppered flask fitted with a reflux condenser and maintained at 70° C. The acid value of the solution was determined and the result corrected to give the acid value of the anhydrous solvent free polyester.

After 1128 hours the acid value of the resin without any stabiliser had increased to 504.4 mg KOH/g. In the presence of the stabiliser the acid value only rose to 17.93 mg KOH/g.

The stabiliser used was the isourea prepared by heating di-p-tolylcarbodiimide with 10% excess of p-nitrophenol in toluene until the carbodiimide band was no longer detectable in the IR spectrum.

EXAMPLE 2

The procedure of Example 1 was repeated with other stabilisers.

Three stabilisers were used separately, these having been obtained by heating di-p-tolylcarbodiimide with the alcohols indicated below until the carbodiimide peak was no longer detectable in the IR spectrum. The acid value after 1060 hours is shown.

methanol; 1.56 mg KOH/g
n-butanol; 5.06 mg KOH/g
t-butanol; 4.49 mg KOH/g

In the absence of a stabiliser the acid value rose to 128.5 mg KOH/g.

EXAMPLE 3

100 parts of p-tolyl isocyanate, 5 parts of a 5% toluene solution of 1-phenyl-3-methylphospholene oxide and 500 parts of dry petroleum ether (b.pt. 60°-80° C) were held at reflux temperature until infra-red examination showed complete conversion of isocyanate to carbodiimide residues.

One half of the carbodiimide solution prepared as described above was mixed with 75 parts of dry methanol and 3.56 parts of sodium were added. After standing overnight, the solution was filtered to remove a small amount of suspended material and the solvents were removed by heating in vacuo. The liquid product was dissolved in 150 parts of petroleum ether and washed with 4 × 150 parts of distilled water. After removal of solvent by heating in vacuo, there was obtained a pale orange, slightly viscous liquid having negligible odour and an infra-red spectrum corresponding to 1,3-di-p-tolyl-2-methylisourea.

6 parts of the isourea prepared as described above, 3.38 parts of 4,4'-diisocyanatodiphenylmethane and 150 parts of dry toluene were heated together until all the isocyanate groups had reacted. Removal of solvent provided an orange-coloured resin melting at 85° C approximately.

A polyurethane elastomer was made by curing a polyester (having a hydroxyl value of 63 mg KOH/g and an acid value of 0.7 mg KOH/g and made by reacting 71 parts of ethylene glycol, 37.25 parts of 1,2-propylene glycol, 4 parts of trimethylolpropane and 210 parts of adipic acid) using a 5% stoichiometric excess of an 80/20 mixture of 2,4- and 2,6-tolylene diisocyanates and 0.015 part of ferric acetylacetonate at 110° C.

When the polyurethane elastomer was boiled in water, its elastomer properties were lost in about 42 hours. When 2% of the orange coloured resin was included in the elastomer, it could be boiled in water for 88 hours before losing its elastomeric properties.

EXAMPLE 4

87 parts of tolylene diisocyanate (an 80/20 mixture of the 2,4- and 2,6-isomers) were reacted at 100° C as a 20% solution in toluene with 16 parts of methanol until no free alcohol remained. Similar portions of tolylene diisocyanate were reacted in the same way with each of benzyl alcohol (54 parts), cyclohexanol (50 parts) and lauryl alcohol (93 parts).

To each solution was added 0.5 part 1-phenyl-3-methylphospholene oxide causing the isocyanate residues to be rapidly converted to carbodiimide groups. Reaction of each with a solution of 1 part of sodium in 100 parts of anhydrous methanol converted the carbodiimides to 2-methylisourea residues. Alkali was removed by washing with water; solvent was removed by heating in vacuo to provide four yellow/brown resinous products.

The procedure described above was repeated using twice the amount of tolylene diisocyanate and then four times the amount of tolylene diisocyanate to give eight more resinous products.

The products prepared as described above were used in the preparation of elastomers as described in Example 3 but using triethylene diamine (0.03 part) in place of ferric acetylacetonate. All of the elastomers retained their rubbery properties far in excess of 80 hours when boiled in water.

EXAMPLE 5

100 parts of bis(3-isocyanato-4-methylphenyl)carbodiimide were reacted with 500 parts of anhydrous methanol at reflux until isocyanate groups were no longer detectable by infra-red examination. Metallic sodium (0.5 part) was added with agitation and the carbodiimide was converted to an isourea. 1000 parts of toluene were added, methanol was distilled off and alkali was removed from the product by washing with water. The solution was dried azeotropically and tolylene diisocyanate (80/20 2,4-/2,6-isomers) equivalent to the —NH— group content of the isourea was added and the mixture held at reflux temperature until no isocyanate residues remained. Removal of toluene provided a resinous product, pale brown in colour.

This product was tested as a stabiliser using the method described in Example 3. The elastomer retained its rubbery properties for more than 70 hours. In the absence of the additive, the rubbery properties of the elastomer were not retained beyond about 40 hours.

I claim:

1. A composition of matter which comprises a compound containing one or more ester groups selected from the group consisting of polyesters and polyesterurethanes and a stabilizing amount of a stabilizer against hydrolysis selected from the group consisting of isourea and isocyanate adducts thereof the amount of said stabilizer being 0.1 to 10 parts by weight per 100 parts of said ester group-containing compound.

2. A composition as claimed in claim 1 wherein the isourea has the formula:

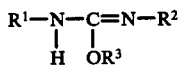

wherein each of $R^1$ and $R^2$ represents an optionally substituted aryl radical and $R^3$ represents a lower alkyl radical.

3. A composition as claimed in claim 1 wherein the isocyanate adduct has the formula:

wherein each of $R^1$, $R^2$ and $R^4$ represents an optionally substituted aryl radical and $R^3$ represents a lower alkyl radical.

4. A composition as claimed in claim 1 wherein the compound containing one or more ester groups is a polyester-urethane.

5. A composition as set forth in claim 1 wherein the amount of said stabilizer is 0.1 to 10 parts by weight per 100 parts of said ester group-containing compound.

* * * * *